United States Patent
Ma et al.

(10) Patent No.: US 10,783,004 B1
(45) Date of Patent: Sep. 22, 2020

(54) METHOD, APPARATUS, AND ELECTRONIC DEVICE FOR IMPROVING PARALLEL PERFORMANCE OF CPU

(71) Applicant: Alibaba Group Holding Limited, George Town (KY)

(72) Inventors: Ling Ma, Hangzhou (CN); Wei Zhou, Hangzhou (CN); Changhua He, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/794,971

(22) Filed: Feb. 19, 2020

(30) Foreign Application Priority Data

Mar. 8, 2019 (CN) .......................... 2019 1 0175628

(51) Int. Cl.
*G06F 9/50* (2006.01)
*G06F 9/30* (2018.01)
*G06F 9/38* (2018.01)
*G06F 9/48* (2006.01)

(52) U.S. Cl.
CPC .......... *G06F 9/5027* (2013.01); *G06F 9/3005* (2013.01); *G06F 9/30098* (2013.01); *G06F 9/3836* (2013.01); *G06F 9/4843* (2013.01)

(58) Field of Classification Search
None
See application file for complete search history.

(56) References Cited

U.S. PATENT DOCUMENTS

| 8,813,073 | B2 | 8/2014 | Kwon et al. | |
|---|---|---|---|---|
| 2007/0283358 | A1 | 12/2007 | Kasahara et al. | |
| 2009/0113170 | A1* | 4/2009 | Abdallah | G06F 9/30181 712/17 |
| 2009/0307704 | A1* | 12/2009 | Munshi | G06F 9/5044 718/104 |
| 2011/0161637 | A1 | 6/2011 | Sihn et al. | |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Philip Wang
*Assistant Examiner* — Rongfa P Wang
(74) *Attorney, Agent, or Firm* — Fish & Richardson P.C.

(57) ABSTRACT

Implementations of the present specification provide a method, an apparatus, and an electronic device for improving parallel performance of a CPU. The method includes: attempting to acquire data requests that are of a same type and that are allocated to the CPU core; determining a number of requests that are specified by the acquired one or more data requests; and in response to determining that the number of requests is greater than or equal to a maximum degree of parallelism: executing executable codes corresponding to the maximum degree of parallelism, wherein the maximum degree of parallelism is a maximum number of parallel threads executable by the CPU, and wherein the executable codes comprise code programs that are compiled and linked based on the maximum degree of parallelism at a time that is prior to a time of the executing.

20 Claims, 5 Drawing Sheets

(56) References Cited

U.S. PATENT DOCUMENTS

| | | | | |
|---|---|---|---|---|
| 2017/0004172 | A1* | 1/2017 | Idei | G06F 16/217 |
| 2017/0038998 | A1* | 2/2017 | Okamoto | G06F 3/0647 |
| 2017/0310983 | A1* | 10/2017 | Gudumasu | H04N 19/136 |
| 2018/0157471 | A1* | 6/2018 | Venkataramani | G06F 8/4441 |
| 2018/0181380 | A1* | 6/2018 | Kasahara | G06F 8/452 |
| 2018/0276046 | A1* | 9/2018 | Joao | G06F 11/3024 |
| 2019/0005582 | A1* | 1/2019 | Kapur | G06Q 40/06 |
| 2019/0012155 | A1 | 1/2019 | Oey et al. | |
| 2019/0236194 | A1* | 8/2019 | James | G06F 16/901 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/US2020/016607, dated May 13, 2020, 15 pages.

\* cited by examiner

METHOD, APPARATUS, AND ELECTRONIC DEVICE FOR IMPROVING PARALLEL PERFORMANCE OF CPU

CROSS-REFERENCE TO RELATED APPLICATIONS

This application claims priority to Chinese Patent Application No. 201910175628.8, filed on Mar. 8, 2019, which is hereby incorporated by reference in its entirety.

TECHNICAL FIELD

Implementations of the present specification relate to the field of Internet technologies, and in particular, to a method, an apparatus, and an electronic device for improving parallel performance of a CPU.

BACKGROUND

In a big data processing scenario, data is showing more and more parallelism, but a central processing unit (CPU) has a limited parallel capability.

In a related technology, parallel performance of a CPU can be improved by adding more CPU hyper-threading, but the hyper-threading requires more CPU hardware overheads. Therefore, CPU hardware performance needs to be continuously improved to satisfy increasingly high parallel requirements.

However, CPU hardware has a relatively long development cycle and high costs.

Therefore, how to explore more CPU performance on parallel processing from the software aspect without adding CPU hardware has become an urgent problem to be resolved in the industry.

SUMMARY

Implementations of the present specification provide a method, an apparatus, and an electronic device for improving parallel performance of a CPU.

According to a first aspect of the implementations of the present specification, a method for improving parallel performance of a CPU is provided, where the method includes: acquiring same type of data requests that are allocated to the same CPU core; determining the number of the acquired data requests; and if the number of requests is greater than or equal to the maximum degree of parallelism, acquiring and executing, by the CPU core, executable codes corresponding to the maximum degree of parallelism, where the maximum degree of parallelism is the maximum number of parallel threads provided by the CPU, and the executable codes are code programs acquired through compiling and linking based on the maximum degree of parallelism in advance.

Optionally, the method further includes: if the number of requests is less than the maximum degree of parallelism, and the number of acquisitions is less than the maximum degree of parallelism, executing the acquired same type of data requests that are allocated to the same CPU core, where the number of acquisitions is the number of acquisitions of requests for data.

Optionally, the method further includes: if the number of requests is less than the maximum degree of parallelism but is greater than 0, and the number of acquisitions is not less than the maximum degree of parallelism, acquiring and executing, by the CPU core, executable codes corresponding to the number of requests, where the number of acquisitions is the number of acquisitions of requests for data.

Optionally, the method further includes: if the number of requests is equal to 0 and the number of acquisitions is not less than the maximum degree of parallelism, executing the step of acquiring same type of data requests that are allocated to the same CPU core.

Optionally, in the process of compiling in advance based on the maximum degree of parallelism: if the maximum degree of parallelism is 2, and both jump instructions of code 00 and code 10 are upward jumps, the following steps are performed: step 31: execute code 00; step 32: execute code 10; step 33: set an identifier bit to a first identifier; step 34: determine, based on an execution result of code 00, whether code 00 needs to be executed continuously; if needed, perform step 35, and if not, perform step 36; step 35: execute code 00 again, set the identifier bit to a second identifier, and perform step 36; step 36: determine, based on an execution result of code 10, whether code 10 needs to be executed continuously; if needed, perform step 37, and if not, perform step 38; step 37: execute code 10 again, set the identifier bit to the second identifier, and perform step 38; and step 38: determine whether the identifier bit is the first identifier; if not, repeatedly perform step 33 until the identifier bit is the first identifier, and the loop ends.

Optionally, the determining, based on an execution result of a code, whether the code needs to be executed again includes: if the execution result of the code satisfies a threshold, determining that the code needs to be executed again; or if the execution result of the code does not satisfy the threshold, determining that the code does not need to be executed again.

Optionally, in the process of compiling in advance based on the maximum degree of parallelism: if the maximum degree of parallelism is 2, and both jump instructions of code 00 and code 10 are downward jumps, the following steps are performed: step 41: execute code 00; step 42: execute jump instruction 00 of code 00, if no jump is performed, perform step 43, and if jump is performed, perform step 44; step 43: sequentially execute instructions, that is, perform step 44; step 44: execute code 10; step 45: execute jump instruction 10 of code 10, if no jump is performed, perform step 46, and if jump is performed, perform step 47; step 46: sequentially execute instructions, that is, perform step 47; and step 47: execute next code 01.

According to a second aspect of the implementations of the present specification, an apparatus for improving parallel performance of a CPU is provided, where the apparatus includes: an acquisition unit, configured to acquire same type of data requests that are allocated to the same CPU core; a determining unit, configured to determine the number of the acquired data requests; and an execution unit, configured to: if the number of requests is greater than or equal to the maximum degree of parallelism, acquire and execute, by the CPU core, executable codes corresponding to the maximum degree of parallelism, where the maximum degree of parallelism is the maximum number of parallel threads provided by the CPU, and the executable codes are code programs acquired through compiling and linking based on the maximum degree of parallelism in advance.

According to a third aspect of the implementations of the present specification, an electronic device is provided, including: a processor; and a memory, configured to store an instruction that can be executed by the processor; where the processor is configured to perform the method for improving parallel performance of a CPU according to any of the previous aspects.

The implementations of the present specification provide a solution for improving parallel performance of a CPU, which makes full use of big data processing characteristics (codes for executing data requests are almost the same, and the data requests has no data correlation), and performs in advance hybrid linking on the same codes based on the maximum degree of parallelism to acquire executable codes corresponding to the maximum degree of parallelism; when the number of data requests is greater than or equal to the maximum degree of parallelism, the executable codes corresponding to the maximum degree of parallelism are directly acquired and executed. As such, one CPU core can achieve a result of executing data requests in parallel. Parallel processing performance of a CPU is improved without adding CPU hardware.

DESCRIPTION OF IMPLEMENTATIONS

Example implementations are described in detail here, example implementations are presented in the accompanying drawings. When the following descriptions relate to the accompanying drawings, unless specified, otherwise, same numbers in different accompanying drawings represent same or similar elements. Implementations described in the following do not represent all implementations consistent with the present specification. On the contrary, the implementations are only examples of devices and methods that are described in the appended claims in detail and consistent with some aspects of the present specification.

The terms used in the present specification are merely for illustrating specific implementations, and are not intended to limit the present specification. The terms "a" and "the" of singular forms used in the present specification and the appended claims are also intended to include plural forms, unless specified in the context clearly. It should be further understood that the term "and/or" used in the present specification indicates and includes any or all possible combinations of one or more associated listed items.

It should be understood that although terms "first", "second", "third", etc. can be used in the present specification to describe various types of information, the information is not limited to the terms. These terms are only used to differentiate information of the same type. For example, without departing from the scope of the present specification, first information can also be referred to as second information, and similarly, the second information can be referred to as the first information. Depending on the context, for example, the word "if" used here can be explained as "while", "when", or "in response to determining".

In a big data processing scenario, more and more data is processed in parallel, but a CPU has a limited parallel capability.

In a related technology, parallel performance of a CPU can be improved by adding more CPU hyper-threading, but the hyper-threading requires more CPU hardware overheads. Therefore, CPU hardware performance needs to be continuously increased. Usually, the number of CPU cores needs to be increased, for example, from a 32-core CPU to a 64-core CPU, to satisfy increasingly high parallel requirements. However, CPU hardware has a relatively long development cycle and high costs. In practice, hardware cannot be added without limits, and parallel performance improvement can decrease as hardware increases.

In the present specification, it is found, by analyzing big data processing characteristics, that data requests in a big data scenario are usually homogeneous. That is, batches of data requests are basically the same, but only include different parameters. Therefore, codes for executing these data requests are almost the same. In addition, there is no data correlation between the data requests in the big data scenario. The data correlation can mean that before a data request is executed, other data requests need to be completed first to acquire execution results of the other data requests, and then the execution results are brought into the current data request. That is, input data of a data request that has data correlation is output data of other data requests. For example, a data request is to subtract 100 from user A's balance, to execute this request, the balance of user A needs to be acquired first. 100 can only be subtracted after the balance of user A is acquired.

The present specification provides a solution for improving parallel performance of a CPU, which makes full use of big data processing characteristics (codes for executing data requests are almost the same, and the data requests has no data correlation), and performs in advance hybrid linking on the same code based on the maximum degree of parallelism to acquire executable codes corresponding to the maximum degree of parallelism. When the number of data requests is greater than or equal to the maximum degree of parallelism, the executable codes corresponding to the maximum degree of parallelism are directly acquired and executed. Because there is no data correlation between codes, one CPU core can achieve a result of executing data requests in parallel. Parallel processing performance of a CPU is improved without adding CPU hardware.

Figure 1:
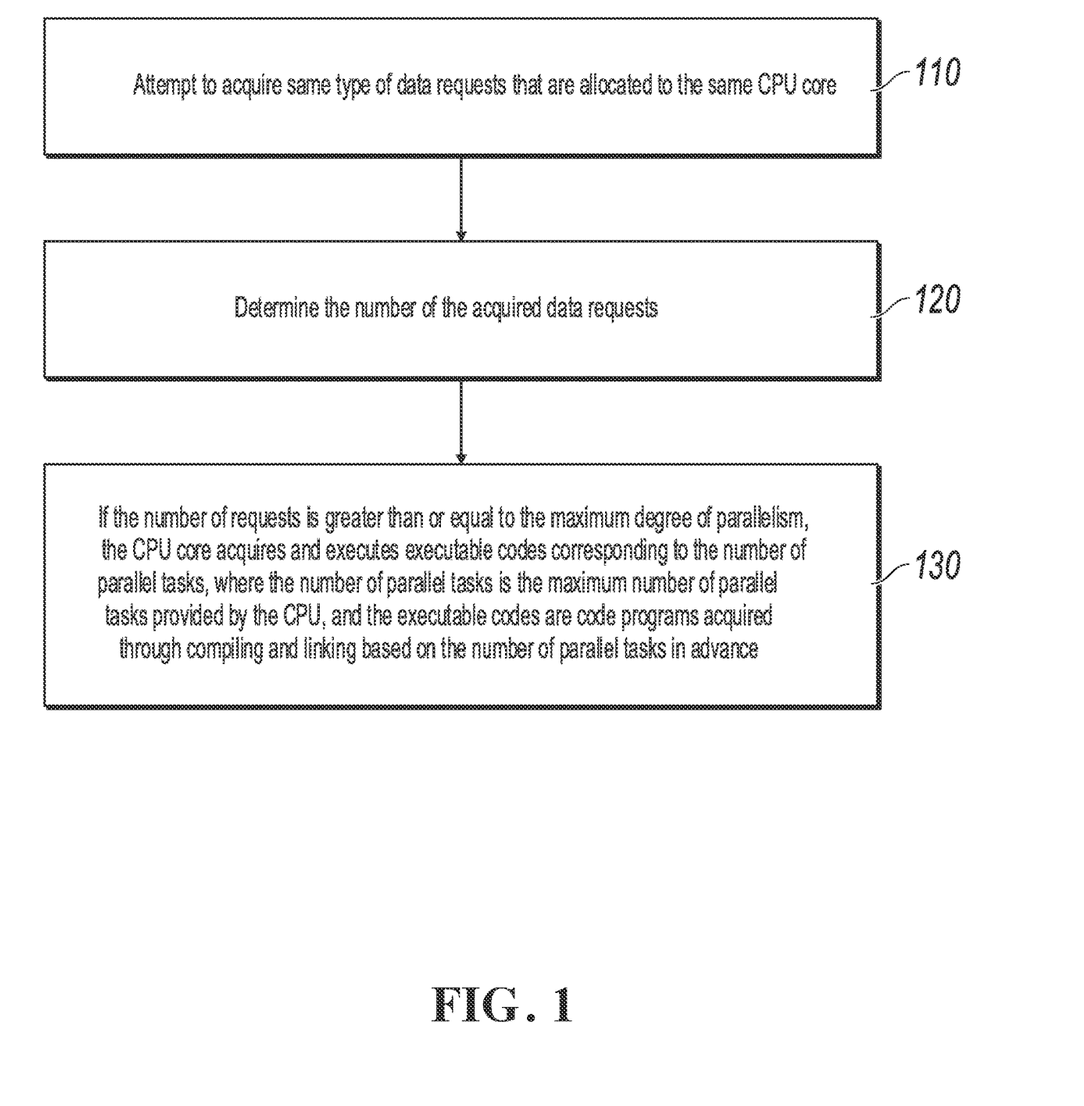
FIG. 1 is a flowchart illustrating a method for improving parallel performance of a CPU, according to an implementation of the present specification.

The following provides a method for improving parallel performance of a CPU with reference to the present specification shown in FIG. 1. The method can be applied to a CPU, and the method includes:

Step 110: Attempt to acquire same type of data requests that are allocated to the same CPU core.

Step 120: Determine the number of the acquired data requests.

Step 130: If the number of requests is greater than or equal to the maximum degree of parallelism, the CPU core acquires and executes executable codes corresponding to the maximum degree of parallelism, where the maximum degree of parallelism is the maximum number of parallel threads provided by the CPU, and the executable codes are code programs acquired through compiling and linking based on the maximum degree of parallelism in advance.

In this implementation of the present specification, the maximum degree of parallelism is the maximum number of parallel threads provided by the CPU. Generally, the CPU can determine the maximum number of parallel threads based on actual hardware resources.

Registers are grouped in advance based on the maximum degree of parallelism. When the maximum degree of parallelism is 3, and the number of registers is N, the registers can be divided into three groups. When the number of requests is 1, the N registers are divided into one group, and executable codes corresponding to one request are compiled.

When the number of requests is 2, the N registers are divided into two groups (N/2 for each group), and executable codes corresponding to two requests are compiled; and when the number of requests is greater than or equal to 3, the N registers are divided into three groups (N/3 for each group), and executable codes corresponding to three requests are compiled.

When the number of the same type of data requests that are allocated to the same CPU core is greater than or equal to the maximum degree of parallelism, the CPU core can acquire and execute the executable codes corresponding to the maximum degree of parallelism. Because the executable codes are code programs acquired through compiling and linking based on the maximum degree of parallelism, all data requests can be processed by executing the executable codes. As such, a single-core CPU can achieve a result of executing data requests in parallel.

In an implementation, the method further includes: if the number of requests is less than the maximum degree of parallelism, and the number of acquisitions is less than the maximum degree of parallelism, executing the step of acquiring same type of data requests that are allocated to the same CPU core, where the number of acquisitions is the number of attempts made by the CPU to acquire data requests.

When the number of the same type of data requests that are allocated to the same CPU core is less than the maximum degree of parallelism, and the number of acquisitions is also less than the maximum degree of parallelism, it indicates that the number of currently acquired data requests does not reach the maximum degree of parallelism. Therefore, step 110 can be performed again to acquire more data requests.

In an implementation, the method further includes: if the number of requests is less than the maximum degree of parallelism but is greater than 0, and the number of acquisitions is not less than the maximum degree of parallelism, the CPU core acquires and executes executable codes corresponding to the number of requests.

If the number of requests is less than the maximum degree of parallelism but greater than 0, and the number of acquisitions is not less than the maximum degree of parallelism, it indicates that the data requests have been acquired for multiple times, but the maximum degree of parallelism has not been reached. It reflects that the number of currently to-be-processed data requests is not large, and these acquired data requests can be directly processed. Pre-compiled executable codes can be acquired based on the number of requests.

In an implementation, the method further includes: if the number of requests is equal to 0 and the number of acquisitions is not less than the maximum degree of parallelism, executing the step of acquiring same type of data requests that are allocated to the same CPU core.

If the number of requests is equal to 0, it indicates that there is no currently to-be-processed data request, and step 110 can be continuously performed to acquire a to-be-processed data request.

Figure 2:
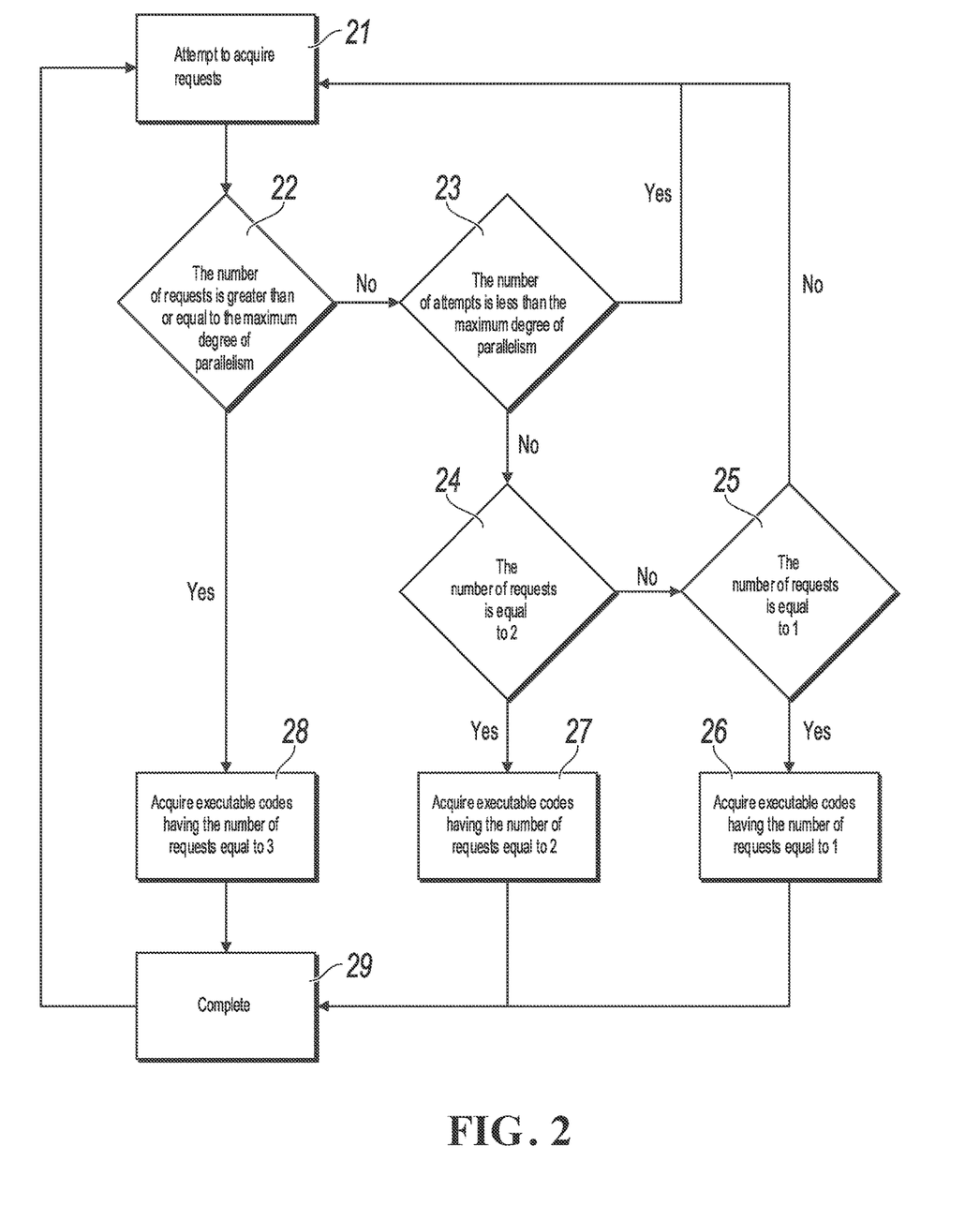
FIG. 2 is a schematic diagram illustrating a parallel processing process in which the maximum degree of parallelism is 3, according to an implementation of the present specification.

The following is described by using an example in which the maximum degree of parallelism is 3, as shown in FIG. 2. Assume that the registers are divided into three groups (used when the number of requests is greater than or equal to 3), two groups (used when the number of requests is 2), or one group (used when the number of requests is 1).

Step 21: Attempt to acquire requests and perform step 22.

Attempt to acquire same type of data requests that are allocated to the same CPU core.

Step 22: If the number of requests (that is, the number of acquired data requests) is greater than or equal to the maximum degree of parallelism, i.e. 3, perform step 28. If the number of requests is less than 3, perform step 23.

If the number of requests is greater than or equal to the maximum degree of parallelism, it indicates that the number of currently to-be-executed data requests reaches the maximum degree of parallelism, and these data requests need to be processed in parallel.

Step 23: If the number of acquisitions (that is, the number of attempts being made to acquire the requests) is less than 3, perform step 21. If the number of acquisitions is not less than (greater than or equal to) 3, perform step 24.

If both the number of requests and the number of acquisitions are less than 3, it indicates that the maximum degree of parallelism is not reached. Therefore, step 21 can be performed again to attempt to acquire more data requests. If the number of requests is less than 3, but the number of acquisitions is not less than (greater than or equal to) 3, it indicates that the data requests have been acquired for multiple times, but the maximum degree of parallelism is still not reached. It reflects that there are only a few currently to-be-processed data requests, and these acquired data requests are directly processed.

Step 24: If the number of requests is equal to 2, perform step 27. If the number of requests is less than 2, perform step 25.

If the number of requests is less than 3 but equal to 2, it indicates that there are two data requests, the two data requests can be processed in parallel.

Step 25: If the number of requests is equal to 1, perform step 26. If the number of requests is less than 1, perform step 21.

If the number of requests is less than 3 but is equal to 1, it indicates that there is only one data request, the data request can be processed alone, and no parallel processing is needed. If the number of requests is less than 1, it indicates that no data request is acquired. In this case, step 21 is repeatedly performed to acquire a to-be-processed data request.

Step 26: Acquire executable codes having the number of requests equal to 1.

If the number of requests is equal to 1, the CPU core acquires the pre-compiled executable codes having the number of requests equal to 1.

Step 27: Acquire executable codes having the number of requests equal to 2.

If the number of requests is equal to 2, the CPU core acquires the pre-compiled executable codes having the number of requests equal to 2.

Step 28: Acquire executable codes having the number of requests equal to 3.

If the number of requests is greater than or equal to 3, the CPU core acquires the pre-compiled executable codes having the number of requests equal to 3.

Step 29: Complete.

The entire CPU parallel processing procedure is shown in FIG. 2.

In practice, because codes of all data requests are the same, jump instructions involved in the process of executing codes are generally the same. For example, all jump instructions are upward or downward jumps. In this case, correct compilation results cannot be acquired during simple hybrid compilation.

For example, assume that when the maximum degree of parallelism is 2, the following codes exist:
Code_00 Code_10
Jump instruction_00 Jump instruction_10
Code_01 Code_11
Jump instruction_01 Jump instruction_11
After simple hybrid compilation:
Code_00
Jump instruction_00
Code_10
Jump instruction_10
Code_01
Jump instruction_01
Code_11
Jump instruction_11.

Assume that all jump instructions are downward jumps, the execution process after simple hybrid compilation is as follows:
Execute code 00 and execute jump instruction 00.
Because jump instruction 00 is downward jump, code 10 can be skipped but code 01 is executed. Similarly, because jump instruction 01 is also downward jump, code 11 can be skipped but code 02 is executed. As such, neither code 10 nor code 11 can be executed.

In conclusion, in a normal case, the CPU has n registers, and a compiler can compile an advanced program language into instruction task codes that are CPU executable by using the n registers. If three tasks are to be run in parallel in one CPU core, same tasks are first separated to generate three pieces of CPU executable instruction task codes by using n/3 groups of registers. To enable the three pieces of CPU executable instruction task codes to run in one CPU core, the compiler needs to be improved again, so the compiler can perform link optimization again on the basis of the previous three pieces of codes.

Although hybrid compilation needs to be performed by using each code as a unit code, directions of jump instructions of all compiled compilation results of the same task are the same. Therefore, it is only necessary to resolve hybrid compilation link results in two cases: simultaneous upward jump and simultaneous downward jump.

Figure 3:
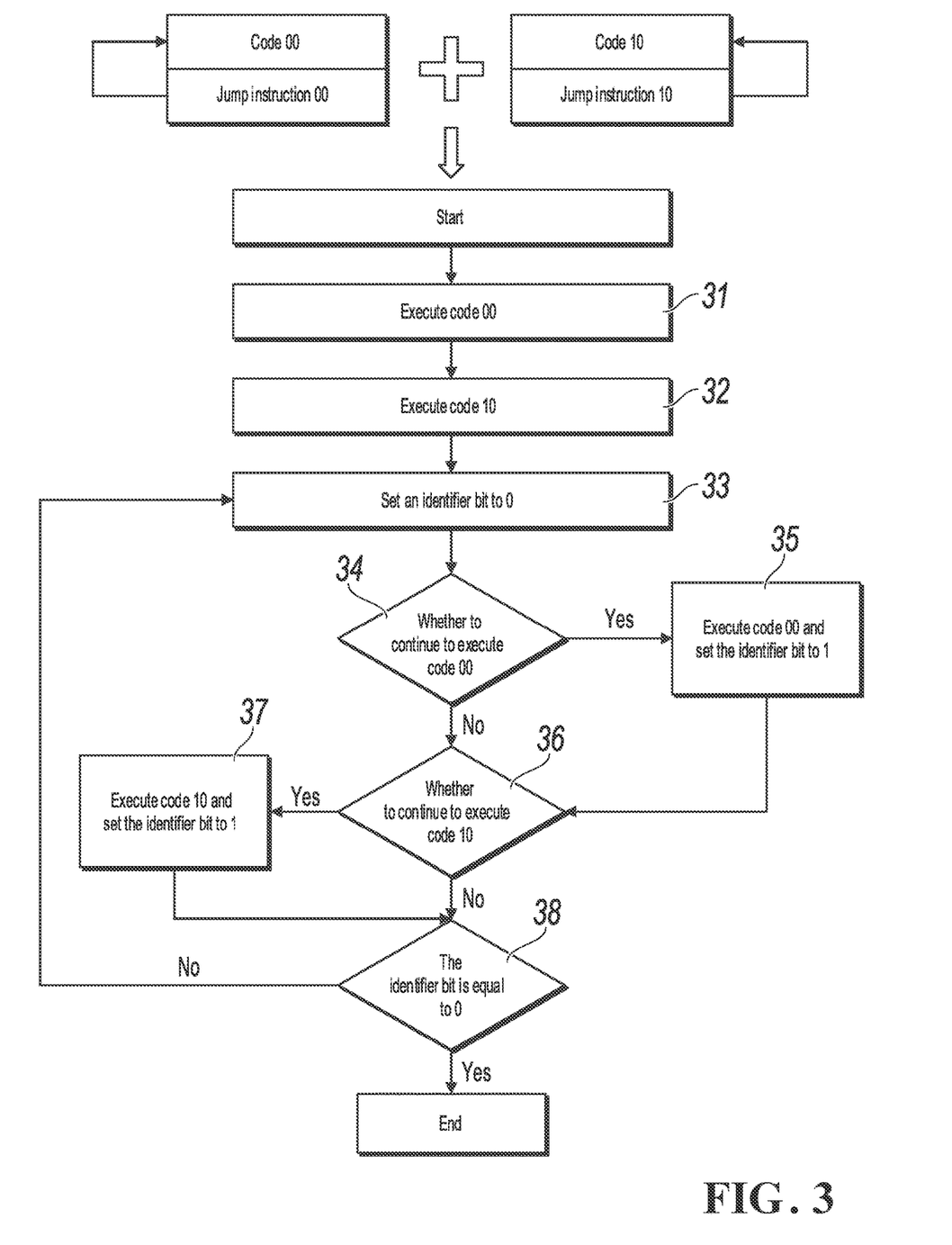
FIG. 3 is a schematic compilation diagram in which both code jump instructions are upward jumps, according to an implementation of the present specification.

FIG. 3 is a schematic compilation diagram in which both jump instructions are upward-jump codes. Assume that the maximum degree of parallelism is 2, and there are code 00 and code 10. Steps are as follows:
Step 31: Execute code 00.
Step 32: Execute code 10.
Step 33: Set an identifier bit to 0 (first identifier).
Step 34: Determine, based on an execution result of code 00, whether code 00 needs to be executed continuously; if needed, perform step 35, and if not, perform step 36.
Step 35: Execute code 00 again, set the identifier bit to 1 (second identifier), and perform step 36.
Step 36: Determine, based on an execution result of code 10, whether code 10 needs to be executed continuously; if needed, perform step 37, and if not, perform step 38.
Step 37: Execute code 10 again, set the identifier bit to 1, and perform step 38.
Step 38: Determine whether the flag bit is 0, and if not, repeatedly perform step 33 (perform looping). The loop ends until the flag bit is 0.

The determining, based on an execution result of a code, whether the code needs to be executed again includes: if the execution result of the code satisfies a threshold, determining that the code needs to be executed again; or if the execution result of the code does not satisfy the threshold, determining that the code does not need to be executed again.

Each of 00, 01, 02, . . . , and 0n represents a result of compiling a task by using one of the groups after the registers are grouped.

In this implementation, whenever there is a code that needs to be executed again, it can be ensured that the flag bit is not 0. Therefore, whenever there is a code that needs to be executed again, looping can be performed again to determine whether there is a code that needs to be executed again, so as to avoid a case in which overall parallel execution ends when there are codes that can be jumped and codes that cannot be jumped.

It is worthwhile to note that the current direction is downward, which is opposite to the original direction. For example, the original upward jump instruction is Ja. Therefore, the downward jump instruction only needs to be changed to Jbe. Such a jump instruction can be easily modified, and can be modified by using the compiler in the CPU. No additional tools are needed.

Figure 4:
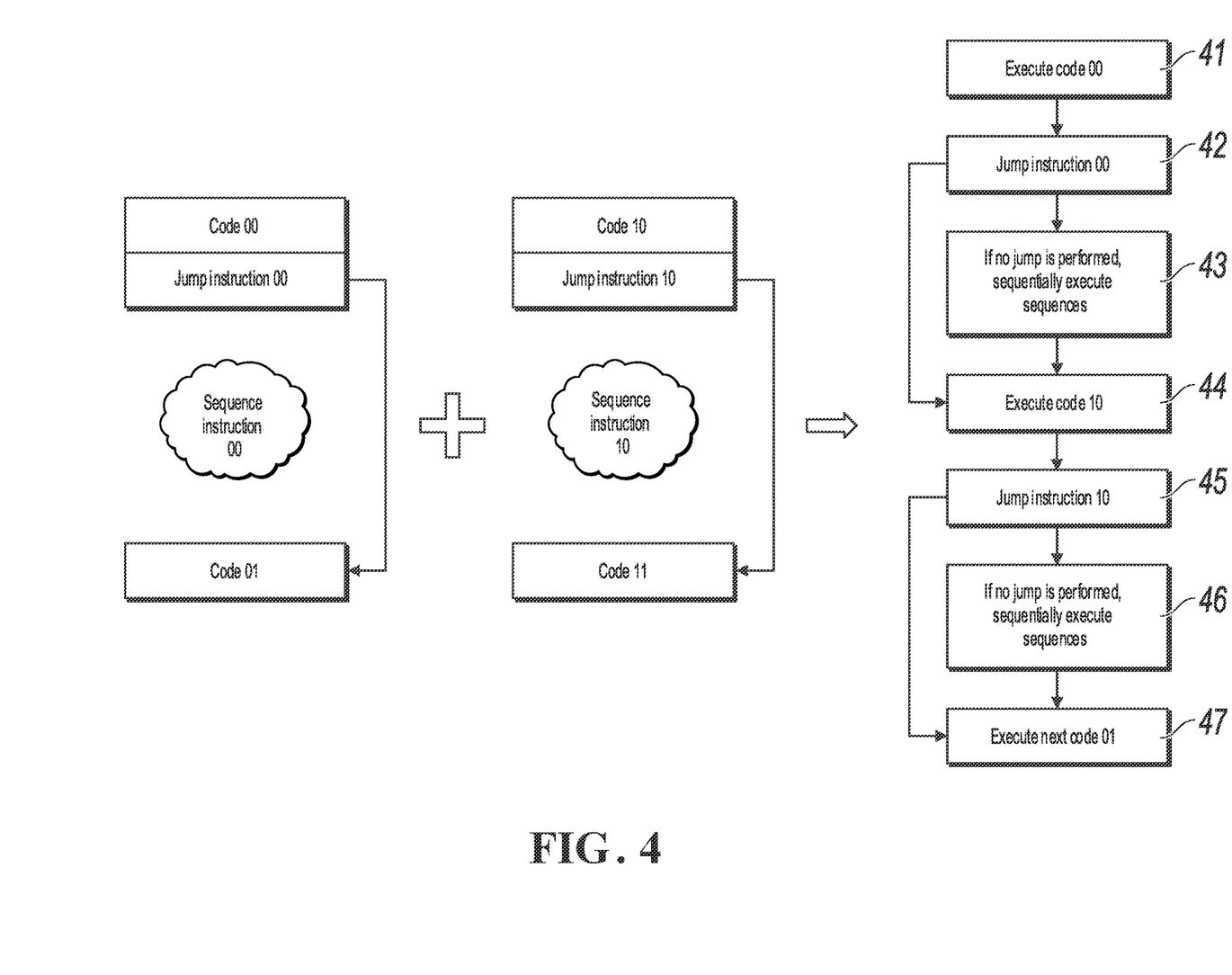
FIG. 4 is a schematic compilation diagram in which both code jump instructions are downward jumps, according to an implementation of the present specification.

FIG. 4 is a schematic compilation diagram in which both jump instructions are downward jump codes. Assume that the maximum degree of parallelism is 2, and there are code 00 and code 10. Steps are as follows:
Step 41: Execute code 00.
Step 42: Execute jump instruction 00, if no jump is performed, perform step 43, and if jump is performed, perform step 44.
Step 43: Sequentially execute instructions, that is, perform step 44.
Step 44: Execute code 10.
Step 45: Execute jump instruction 10, if no jump is performed, perform step 46, and if jump is performed, perform step 47.
Step 46: Sequentially execute instructions, that is, perform step 47.
Step 47: Execute next code 01.

Each of 00, 01, 02, . . . , and 0n represents a result of compiling a task by using one of the groups after the registers are grouped.

According to the previous upward or downward jump implementation, during link hybrid compilation, each jump module is used as a hybrid compilation unit, and two hybrid link methods of simultaneously jumping upward and simultaneously jumping downward are processed.

In conclusion, when the CPU runs the hybrid compilation results, because different registers do not correlate with each other, the hybrid compilation results can be processed in parallel in the CPU core, and parallel performance of task processing is finally improved. It is worthwhile to note that, in the solution provided in the present specification, the maximum degree of parallelism that can be increased depends on the number of current CPU registers. Therefore, the CPU parallel processing capability can be improved without increasing hardware overheads.

Corresponding to the previous method implementation for improving parallel performance of a CPU, the present specification further provides an implementation of an apparatus for improving parallel performance of a CPU.

Figure 5:
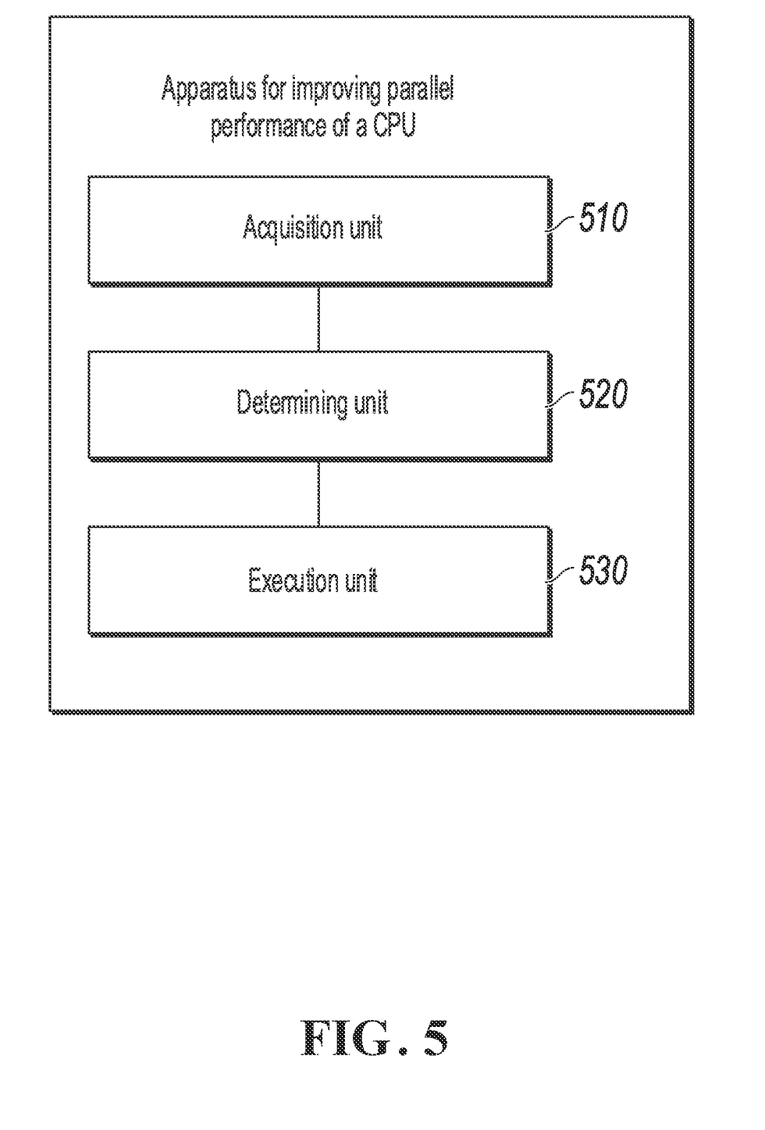
FIG. 5 is a schematic module diagram illustrating an apparatus for improving parallel performance of a CPU, according to an implementation of the present specification.

FIG. 5 is a block diagram illustrating an apparatus for improving parallel performance of a CPU, according to an implementation of the present specification. The apparatus corresponds to the implementation shown in FIG. 1, the CPU includes a register, and the apparatus includes: an acquisition unit 510, configured to acquire same type of data requests that are allocated to the same CPU core; a determining unit 520, configured to determine the number of the acquired data requests; and an execution unit 530, configured to: if the number of requests is greater than or equal to the maximum degree of parallelism, acquire and execute, by the CPU core, executable codes corresponding to the maximum degree of parallelism, where the maximum degree of parallelism is the maximum number of parallel threads provided by the CPU, and the executable codes are code programs acquired through compiling and linking based on the maximum degree of parallelism in advance.

Optionally, the apparatus further includes: a first acquisition subunit, configured to execute acquired same type of data requests that are allocated to the same CPU core if the number of requests is less than the maximum degree of parallelism, and the number of acquisitions is less than the maximum degree of parallelism, where the number of acquisitions is the number of acquisitions of requests for data.

Optionally, the apparatus further includes: a first execution subunit, configured to: if the number of requests is less than the maximum degree of parallelism but is greater than 0, and the number of acquisitions is not less than the maximum degree of parallelism, acquire and execute, by the CPU core, executable codes corresponding to the number of requests, where the number of acquisitions is the number of acquisitions of requests for data.

Optionally, the apparatus further includes: a second acquisition subunit, configured to: if the number of requests is equal to 0 and the number of acquisitions is not less than the maximum degree of parallelism, execute the step of acquiring same type of data requests that are allocated to the same CPU core.

Optionally, in the process of compiling in advance based on the maximum degree of parallelism: if the maximum degree of parallelism is 2, and both jump instructions of code 00 and code 10 are upward jumps, the following subunits are performed: a first execution subunit, configured to execute code 00; a second execution subunit, configured to execute code 10; a first setting subunit, configured to set an identifier bit to a first identifier; a first determining subunit, configured to determine, based on an execution result of code 00, whether code 00 needs to be executed continuously; if needed, execute a third execution subunit, and if not, execute a second determining subunit; the third execution subunit, configured to execute code 00 again, set the identifier bit to a second identifier, and execute the second determining subunit; the second determining subunit, configured to determine, based on an execution result of code 10, whether code 10 needs to be executed continuously; if needed, execute a fourth execution subunit, and if not, execute an identifier determining subunit; the fourth execution subunit, configured to execute code 10 again, set the identifier bit to the second identifier, and execute the identifier determining subunit; and the identifier determining subunit, configured to determine whether the identifier bit is the first identifier, and if not, repeatedly execute the first setting subunit until the identifier bit is the first identifier, and the loop ends.

Optionally, the determining, based on an execution result of a code, whether the code needs to be executed again includes: if the execution result of the code satisfies a threshold, determining that the code needs to be executed again; or if the execution result of the code does not satisfy the threshold, determining that the code does not need to be executed again.

Optionally, in the process of compiling in advance based on the maximum degree of parallelism: if the maximum degree of parallelism is 2, and both jump instructions of code 00 and code 10 are downward jumps, the following subunits are performed: a first execution subunit, configured to execute code 00; a first jump subunit, configured to execute jump instruction 00 of code 00, if no jump is performed, execute a first sequence subunit, and if jump is performed, execute a second execution subunit; the first sequence subunit, configured to execute instructions sequentially, that is, execute the second execution subunit; the second execution subunit, configured to execute code 10; a second jump subunit, configured to execute jump instruction 10 of code 10, if no jump is performed, execute a second sequence subunit, and if jump is performed, execute a third execution subunit; the second sequence subunit, configured to execute instructions sequentially, that is, execute the third execution subunit; and the third execution subunit, configured to execute a next code 01.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here.

Because an apparatus implementation basically corresponds to a method implementation, for related parts, references can be made to related descriptions in the method implementation. The previously described apparatus implementation is merely an example. The units described as separate parts can or cannot be physically separate, and parts displayed as units can or cannot be physical units, can be located in one position, or can be distributed on a plurality of network units. Some or all of the modules can be selected based on actual requirements to achieve the objectives of the solutions of the present specification. Persons of ordinary skill in the art can understand and implement the implementations of the present application without creative efforts.

FIG. 5 describes a schematic diagram of an internal function module and a structure of the apparatus for improving parallel performance of a CPU. Essentially, an execution body can be an electronic device, including: a processor; and a memory, configured to store an instruction that can be executed by the processor; where the processor is configured to: acquire same type of data requests that are allocated to the same CPU core; determine the number of the acquired data requests; and if the number of requests is greater than or equal to the maximum degree of parallelism, acquire and execute, by the CPU core, executable codes corresponding to the maximum degree of parallelism, where the maximum degree of parallelism is the maximum number of parallel threads provided by the CPU, and the executable codes are code programs acquired through compiling and linking based on the maximum degree of parallelism in advance.

Optionally, the method further includes: if the number of requests is less than the maximum degree of parallelism, and the number of acquisitions is less than the maximum degree of parallelism, executing the step of acquiring same type of data requests that are allocated to the same CPU core, where the number of acquisitions is the number of acquisitions of requests for data.

Optionally, the method further includes: if the number of requests is less than the maximum degree of parallelism but is greater than 0, and the number of acquisitions is not less than the maximum degree of parallelism, acquiring and executing, by the CPU core, executable codes corresponding to the number of requests, where the number of acquisitions is the number of acquisitions of requests for data.

Optionally, the method further includes: if the number of requests is equal to 0 and the number of acquisitions is not less than the maximum degree of parallelism, executing the step of acquiring same type of data requests that are allocated to the same CPU core.

Optionally, in the process of compiling in advance based on the maximum degree of parallelism: if the maximum degree of parallelism is 2, and both jump instructions of code 00 and code 10 are upward jumps, the following steps are performed: step 31: execute code 00; step 32: execute code 10; step 33: set an identifier bit to a first identifier; step 34: determine, based on an execution result of code 00, whether code 00 needs to be executed continuously; if needed, perform step 35, and if not, perform step 36; step 35: execute code 00 again, set the identifier bit to a second identifier, and perform step 36; step 36: determine, based on an execution result of code 10, whether code 10 needs to be executed continuously; if needed, perform step 37, and if not, perform step 38; step 37: execute code 10 again, set the identifier bit to the second identifier, and perform step 38; and step 38: determine whether the identifier bit is the first identifier; if not, repeatedly perform step 33 until the identifier bit is the first identifier, and the loop ends.

Optionally, the determining, based on an execution result of a code, whether the code needs to be executed again includes: if the execution result of the code satisfies a threshold, determining that the code needs to be executed again; or if the execution result of the code does not satisfy the threshold, determining that the code does not need to be executed again.

Optionally, in the process of compiling in advance based on the maximum degree of parallelism: if the maximum degree of parallelism is 2, and both jump instructions of code 00 and code 10 are downward jumps, the following steps are performed: step 41: execute code 00; step 42: execute jump instruction 00 of code 00, if no jump is performed, perform step 43, and if jump is performed, perform step 44; step 43: sequentially execute instructions, that is, perform step 44; step 44: execute code 10; step 45: execute jump instruction 10 of code 10, if no jump is performed, perform step 46, and if jump is performed, perform step 47; step 46: sequentially execute instructions, that is, perform step 47; and step 47: execute next code 01.

In the previous implementation of the electronic device, it should be understood that the processor can be a central processing unit (CPU), or can be other general purpose processors, a digital signal processor (DSP), an application specific integrated circuit (ASIC), etc. The general purpose processor can be a microprocessor or any conventional processors, etc. The previous memory can be a read-only memory (ROM), a random access memory (RAM), a flash memory, a hard disk, or a solid-state disk. The steps of the methods disclosed in some implementations of the present disclosure can be directly performed by a hardware processor, or performed by a combination of hardware and software modules in the processor.

The implementations in the present specification are described in a progressive way. For same or similar parts of the implementations, references can be made to the implementations. Each implementation focuses on a difference from other implementations. Particularly, the electronic device implementation is basically similar to the method implementation, and therefore, is described briefly. For related parts, references can be made to related descriptions in the method implementation.

Persons skilled in the present field can easily figure out another implementation of the present specification after thinking over the specification and practicing the present disclosure here. The present specification intends to cover any variations, uses, or adaptations of the present specification, and these variations, uses, or adaptations follow the general principles of the present specification and include common knowledge or conventional techniques that are not disclosed in the technical field of the present specification. The specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present disclosure. The scope of the present specification is limited by the appended claims only.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method for improving parallel performance of a CPU, the method comprising:
   attempting, by a CPU core, to acquire data requests that are of a same type and that are allocated to the CPU core;
   determining, by the CPU core, a number of data requests that are acquired; and
   in response to determining that the number of data requests that are acquired is greater than or equal to a maximum degree of parallelism:
      executing, by the CPU core, executable codes corresponding to the maximum degree of parallelism, wherein the maximum degree of parallelism is a maximum number of parallel threads executable by the CPU, and wherein the executable codes comprise code programs that are compiled and linked based on the maximum degree of parallelism at a time that is prior to a time of the executing.

2. The method according to claim 1, further comprising:
   in response to determining that the number of data requests that are acquired is less than the maximum degree of parallelism, and a number of attempts made by the CPU core to acquire data requests is less than the maximum degree of parallelism:
  attempting, by the CPU core, to acquire data requests that are of the same type and that are allocated to the CPU core.

3. The method according to claim 1, further comprising:
in response to determining that the number of data requests that are acquired is less than the maximum degree of parallelism but is greater than 0, and the number of attempts made by the CPU core to acquire data requests is not less than the maximum degree of parallelism:
  executing, by the CPU core, executable codes corresponding to the number of data requests that are acquired.

4. The method according to claim 3, further comprising:
in response to determining that the number of data requests that are acquired is equal to 0 and the number of attempts made by the CPU core to acquire data requests is not less than the maximum degree of parallelism:
  attempting, by the CPU core, to acquire data requests that are of the same type and that are allocated to the CPU core.

5. The method according to claim 1, wherein in the code programs are compiled by performing operations comprising:
  determining that the maximum degree of parallelism is equal to 2; and
  in response to determining that the maximum degree of parallelism is equal to 2:
    executing code corresponding to a first upward jump;
    executing code corresponding to a second upward jump; and
    setting an identifier bit to a first identifier.

6. The method according to claim 5, wherein the operations further comprise:
  determining, based on an execution result of the code, whether the code requires continued execution;
  in response to determining that the execution result of the code satisfies a threshold:
    determining that the code requires repeated execution; and
  in response to determining that the execution result of the code does not satisfy the threshold:
    determining that the code does not require repeated execution.

7. The method according to claim 1, wherein in the code programs are compiled by performing operations comprising:
  determining that the maximum degree of parallelism is equal to 2; and
  in response to determining that the maximum degree of parallelism is equal to 2:
    executing code corresponding to a first downward jump; and
    executing code corresponding to a second downward jump.

8. The method according to claim 1, wherein the type of data requests comprises an upward jump or a downward jump.

9. The method according to claim 1, wherein each of the parallel threads is assigned to an equally sized group of registers.

10. A non-transitory, computer-readable medium storing one or more instructions executable by a computer system to perform operations for improving parallel performance of a CPU, the operations comprising:
  attempting, by a CPU core, to acquire data requests that are of a same type and that are allocated to the CPU core;
  determining, by the CPU core, a number of data requests that are acquired; and
  in response to determining that the number of data requests that are acquired is greater than or equal to a maximum degree of parallelism:
    executing, by the CPU core, executable codes corresponding to the maximum degree of parallelism, wherein the maximum degree of parallelism is a maximum number of parallel threads executable by the CPU, and wherein the executable codes comprise code programs that are compiled and linked based on the maximum degree of parallelism at a time that is prior to a time of the executing.

11. The non-transitory, computer-readable medium according to claim 10, wherein the operations further comprise:
  in response to determining that the number of data requests that are acquired is less than the maximum degree of parallelism, and a number of attempts made by the CPU core to acquire data requests is less than the maximum degree of parallelism:
    attempting, by the CPU core, to acquire data requests that are of the same type and that are allocated to the CPU core.

12. An electronic device, comprising:
a processor; and
a memory, configured to store an instruction that can be executed by the processor; wherein
the processor is configured to perform operations for improving parallel performance of a CPU, the operations comprising:
  attempting, by a CPU core, to acquire data requests that are of a same type and that are allocated to the CPU core;
  determining, by the CPU core, a number of data requests that are acquired; and
  in response to determining that the number of data requests that are acquired is greater than or equal to a maximum degree of parallelism:
    executing, by the CPU core, executable codes corresponding to the maximum degree of parallelism, wherein the maximum degree of parallelism is a maximum number of parallel threads executable by the CPU, and wherein the executable codes comprise code programs that are compiled and linked based on the maximum degree of parallelism at a time that is prior to a time of the executing.

13. The electronic device according to claim 12, wherein the operations further comprise:
  in response to determining that the number of data requests that are acquired is less than the maximum degree of parallelism, and a number of attempts made by the CPU core to acquire data requests is less than the maximum degree of parallelism:
    attempting, by the CPU core, to acquire data requests that are of the same type and that are allocated to the CPU core.

14. The electronic device according to claim 12, wherein the operations further comprise:
  in response to determining that the number of data requests that are acquired is less than the maximum degree of parallelism but is greater than 0, and the number of attempts made by the CPU core to acquire data requests is not less than the maximum degree of parallelism:

executing, by the CPU core, executable codes corresponding to the number of data requests that are acquired.

15. The electronic device according to claim 14, wherein the operations further comprise:

in response to determining that the number of data requests that are acquired is equal to 0 and the number of attempts made by the CPU core to acquire data requests is not less than the maximum degree of parallelism:

attempting, by the CPU core, to acquire data requests that are of the same type and that are allocated to the CPU core.

16. The electronic device according to claim 12, wherein in the code programs are compiled by performing compiling operations comprising:

determining that the maximum degree of parallelism is equal to 2; and     in response to determining that the maximum degree of parallelism is equal to 2:

executing code corresponding to a first upward jump;

executing code corresponding to a second upward jump; and         setting an identifier bit to a first identifier.

17. The electronic device according to claim 16, wherein the compiling operations further comprise:

determining, based on an execution result of a code, whether the code requires continued execution;

in response to determining that the execution result of the code satisfies a threshold:

determining that the code requires repeated execution; and     in response to determining that the execution result of the code does not satisfy the threshold:

determining that the code does not require repeated execution.

18. The electronic device according to claim 12, wherein in the code programs are compiled by performing compiling operations comprising:

determining that the maximum degree of parallelism is equal to 2; and     in response to determining that the maximum degree of parallelism is equal to 2:

executing code corresponding to a first downward jump; and         executing code corresponding to a second downward jump.

19. The electronic device according to claim 12, wherein the type of data requests comprises an upward jump or a downward jump.

20. The electronic device according to claim 12, wherein each of the parallel threads is assigned to an equally sized group of registers.

* * * * *